United States Patent
Takase

(10) Patent No.: US 8,011,283 B2
(45) Date of Patent: Sep. 6, 2011

(54) DESK-TOP CUTTING MACHINE

(75) Inventor: Kouji Takase, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 387 days.

(21) Appl. No.: 11/930,666

(22) Filed: Oct. 31, 2007

(65) Prior Publication Data

US 2008/0184861 A1    Aug. 7, 2008

(30) Foreign Application Priority Data

Nov. 2, 2006  (JP) ................. P2006-299108

(51) Int. Cl.
*B26D 7/00*   (2006.01)
*F21V 33/00*  (2006.01)
*B27B 5/29*   (2006.01)

(52) U.S. Cl. ............. 83/520; 83/471.3; 83/473; 83/490; 83/581

(58) Field of Classification Search .................... 83/520, 83/521, 581, 471.3, 473, 490; 33/286, DIG. 21; 362/119, 23–30
See application file for complete search history.

(56) References Cited

U.S. PATENT DOCUMENTS

| | | | | |
|---|---|---|---|---|
| 2,618,860 | A * | 11/1952 | Engelhart | 33/679 |
| 6,481,322 | B1 * | 11/2002 | Hsiung | 83/521 |
| 6,820,528 | B1 * | 11/2004 | Liu et al. | 83/520 |
| 7,039,548 | B2 * | 5/2006 | Takano et al. | 702/151 |
| 7,207,251 | B2 * | 4/2007 | Ushiwata et al. | 83/520 |
| 7,284,335 | B2 * | 10/2007 | Park et al. | 33/286 |
| 7,523,691 | B2 * | 4/2009 | Terashima et al. | 83/471.3 |
| 2002/0100352 | A1 * | 8/2002 | Dils et al. | 83/473 |
| 2003/0172789 | A1 * | 9/2003 | Chen | 83/522.15 |
| 2003/0233921 | A1 * | 12/2003 | Garcia et al. | 83/520 |
| 2004/0221704 | A1 * | 11/2004 | Liu et al. | 83/520 |
| 2005/0076760 | A1 * | 4/2005 | Takano et al. | 83/581 |
| 2006/0230894 | A1 * | 10/2006 | Meredith et al. | 83/13 |

FOREIGN PATENT DOCUMENTS

| | | |
|---|---|---|
| JP | 63-131321 | 8/1988 |
| JP | 03-043115 | 2/1991 |
| JP | 07-047502 | 2/1995 |
| JP | 2000-317901 | 11/2000 |
| JP | 2004-284108 | 10/2004 |
| JP | 2005-225226 | 8/2005 |
| JP | 2006-015576 | 1/2006 |
| JP | 2006-015580 | 1/2006 |

OTHER PUBLICATIONS

Japanese Office Action, with English translation, issued in Japanese Patent Application No. 2006-299108, dated Aug. 19, 2010.

* cited by examiner

*Primary Examiner* — Laura M. Lee
(74) *Attorney, Agent, or Firm* — McDermott Will & Emery LLP

(57) ABSTRACT

A desk-top cutting machine which includes a base that supports a wood material W and a turntable that has a rotating shaft part and is carried and supported on the base rotatably around the rotating shaft part. The desk-top cutting machine further includes a cutting part having a swinging shaft part. The cutting part is disposed on the turntable and supports a cutting blade, and swings the cutting blade approachably to and separably from the turntable. The desk-top cutting machine further includes a scale part and an indicator part which display a rotary angle of the turntable with the base, and an irradiation unit near the indicator part emitting light that illuminates the indicator part.

6 Claims, 10 Drawing Sheets

DESK-TOP CUTTING MACHINE

This application is based on and claims the benefit of priority from the prior Japanese Patent Application No. 2006-299108, filed on Nov. 2, 2007; the entire contents of which are incorporated herein by reference.

BACKGROUND

1. Technical Field

The present invention relates to a desk-top cutting machine, and particularly to a desk-top cutting machine provided with an irradiation unit.

2. Description of Related Art

Heretofore, in order to cut a workpiece such as a wood material at an arbitrary cutting angle, there has been known a desk-top cutting machine including a base on which a workpiece to be cut is placed, a turntable which is rotatably carried and supported on the base, and a cutting part which is disposed on the turntable and supports swingably a cutting blade. In this desk-top cutting machine, the turntable is rotated in relation to the base thereby to change an angle of the cutting blade with the workpiece and set the arbitrary cutting angle.

It is disclosed by, for example, JP-A-2000-317901 that an irradiation unit irradiates the workpiece with light, whereby visibility of the workpiece in a cutting operation in the dark is heightened.

SUMMARY

Generally, in a desk-top cutting machine having a turntable which rotates on a base, a display part which displays a rotary angle of the turntable is installed. This display part is arranged, so that an operator can readily recognize visually the display part even in case that the workpiece is placed on the base, in the forward position of the desk-top cutting machine, which is a position on the operator's side.

In case that the display part is arranged forward of the desk-top cutting machine, there is a desk-top cutting machine having such a construction that a 0°-position is shifted from a center position of the base so as to avoid the front end portion of the turntable when the rotary angle is 0°, and an indicator part is shifted. The dislocation of this desk-top cutting machine is difficult for an operator who is not an expert to grasp.

Further, in case that an irradiation unit is installed in the cutting part, irradiation is not sufficiently performed to the display part arranged forward of the desk-top cutting machine because a preference is offered to irradiation onto the workpiece, so that visibility is not secured. Particularly, in case that the workpiece is thick, there is a possibility that the shadow of the workpiece falls on the irradiation unit and the visibility lowers. Accordingly, under the operation in the dark, it is necessary to lighten the display part by means of a light or the like to adjust the rotary angle.

Further, an ink line is drawn on a top surface and a side surface of the workpiece to indicate the position on the workpiece to be cut. However, in the above-mentioned desk-top cutting machine, in case that each workpiece is placed on the turntable, only the top surface is irradiated. Therefore, the visibility of the side portion may lower.

Therefore, an object of the invention is to provide a desk-top cutting machine which increases visibility of a rotary angle and a cutting condition of a workpiece.

In order to solve the above problems, the invention provides a desk-top cutting machine which includes a base that supports a workpiece, a turntable that has a rotating shaft part and is carried and supported on the base rotatably around the rotating shaft part, a cutting part having a swinging shaft part, the cutting part being disposed on the turntable, the cutting part supporting a cutting blade up of the turntable, and swinging the cutting blade approachably to and separably from the turntable, a rotary angle display part which displays a rotary angle of the turntable with the base, and an irradiation unit which is provided near the rotary angle display part and emits light that illuminates at least the rotary angle display part.

According to such a construction, since the light can be directed to the rotary angle display part, the rotary angle display part can be readily recognized visually in the dark.

In the above desk-top cutting machine, it is preferable that: the turntable has a cutting part supporting portion which supports the cutting part, and a base portion which is provided on the opposite side of the cutting part supporting portion in relation to the rotating shaft part, and the irradiation unit is provided on the base portion.

According to such a construction, since the base portion is located on an operator's side in the desk-top cutting machine, light is emitted from this position toward the rotary angle display part, whereby visibility of an operator in relation to the rotary angle display part can be heightened.

Further, it is preferable that: the rotary angle display part is composed of a scale part provided on the base and a indicator part which is provided for the base portion and indicates the scale part, and the irradiation unit emits light illuminating at least the indicator part.

According to such a construction, in the rotary angle display part, the light can be emitted in the most important position, with the result that the visibility for the operator can be heightened more.

Further, it is preferable that: the irradiation unit includes an irradiation part and an irradiation supporting part, the irradiation part has a light source which can emit light toward the rotating shaft part side, and the irradiation supporting part supports rotatably the irradiation part through a shaft which is orthogonal to a direction from the rotating shaft part to the irradiation part and parallel to the upper surface of the turntable.

According to such a construction, the irradiating range can be extended. Therefore, the light can be directed not only to the rotary angle display part but also to the workpiece placed on the base and arranged on the turntable.

Further, it is preferable that: the irradiation unit includes an irradiation part and an irradiation supporting part, the irradiation part has a light source which can emit light toward the rotating shaft part side, and the irradiation supporting part supports rotatably the irradiation part through a shaft which is orthogonal to a direction from the rotating shaft part to the irradiation part and parallel to the upper surface of the turntable.

According to such a construction, the construction in which the irradiation part is covered with the irradiation supporting part can be adopted. Therefore, even if the workpiece falls on the irradiation unit, the irradiation part is protected and damage of the irradiation part can be prevented.

Further, the irradiation unit may be constructed so that it can emit laser beam and the laser beam can be emitted onto a swinging locus of the cutting blade in a state where the side surface of the cutting blade is orthogonal to the upper surface of the turntable.

According to such a construction, since the laser beam is applied onto the swinging locus of the cutting blade, a marking line can be drawn on the workpiece on the turntable located on this locus by the laser beam.

Further, it is preferable that: between the cutting part and the turntable, a tilt shaft part is provided, which is arranged on the same plane as the upper surface of the turntable so as to be nearly orthogonal to the swinging shaft part, and connects the cutting part to the turntable tiltably, and the irradiation unit is constructed so that it can emit the laser beam along a tilt shaft of the tilt shaft part.

According to such a construction, even in case that the cutting part tilts, the locus of the cutting blade can intersect an extension line of the tilt shaft. Further, since the laser beam is emitted along the tile shaft, the locus of the cutting blade and the laser beam intersect at the extension line portion of the tilt shaft. Therefore, in a state where the workpiece is arranged on the turntable, the workpiece portion which becomes the extension line portion of the tilt shaft can be visually recognized, and this portion can be used as a guide in the cutting time.

Further, in order to solve the above problems, the invention provides a desk-top cutting machine which includes a base that supports a workpiece, a turntable that has a rotating shaft part and is carried and supported on the base rotatably around the rotating shaft part, a cutting part having a swinging shaft part which is disposed on the turntable, supports a cutting blade up off the turntable, and swings the cutting blade approachably to and separably from the turntable, a tilt shaft part which is provided between the cutting part and the turntable, arranged on the same plane as the upper surface of the turntable so as to be nearly orthogonal to the swinging shaft part, and connects the cutting part to the turntable tiltably, and an irradiation unit which is provided on the opposite tilt shaft part side of the turntable and can emit laser beam on a swinging locus of the cutting blade.

According to such a construction, in a workpiece having a complicated shape such as a crowding mold material, the laser beam can be issued to the portion on the operator's side of a marking line drawn on the workpiece, that is, the portion on the front side. Therefore, even in such the workpiece, the operator can align the marking line with the laser beam readily, so that cutting along the marking line can be readily performed with good accuracy.

Further, in the above construction, it is preferable that the irradiation unit is constructed so that it can emit the laser beam onto the tilt shaft of the tilt shaft part.

According to such a construction, even in bevel cutting, since the laser beam is emitted onto the last cutting portion, that is, the vicinity of the tilt shaft part, the operator can align the marking line previously drawn on the workpiece with the laser beam, so that cutting along the marking line can be readily performed with good accuracy.

Further, it is preferable that: the turntable has a space portion having an opening at least on the upper surface, the irradiation unit has an irradiation part which emits the laser beam, and the irradiation part is arranged in the space portion, and constructed so as not to protrude from the upper surface of the turntable upward.

According to such a construction, it is possible to prevent a workpiece or a tool from colliding with an illumination unit, and more particularly an irradiation part and damaging the illumination device or the irradiation part. Further, though an illumination unit which emits generally laser beam includes an adjustment mechanism for adjusting a positional relation between an irradiation part for emitting the laser beam and a cutting blade side surface, it is possible to prevent the position of the illumination part from shifting suddenly due to collision of the material to be cut or other members with the illumination part.

According to the desk-top cutting machine of the invention, it is possible to increase visibility of the rotary angle of the turntable and the cutting condition of the workpiece.

DESCRIPTION OF THE EMBODIMENTS

Figure 1:
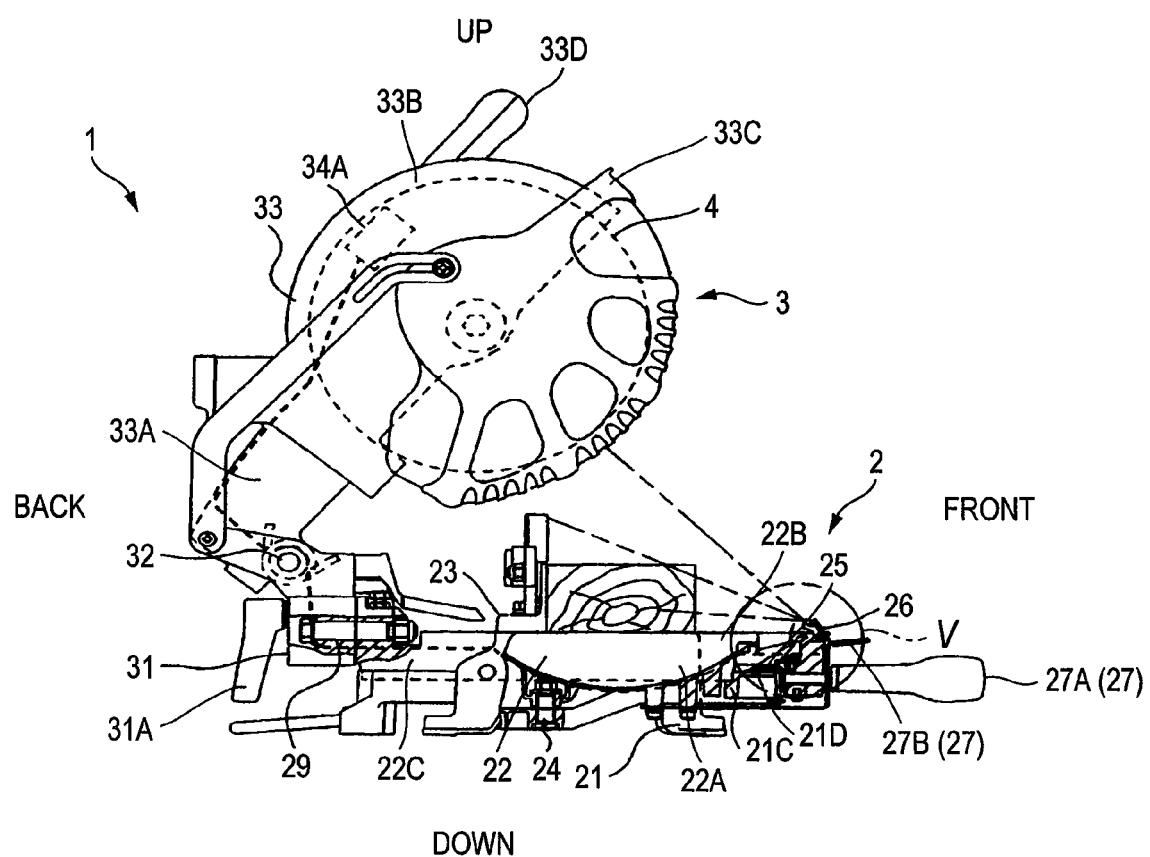
FIG. 1 is a side view of a desk-top cutting machine according to an embodiment of the invention.

An embodiment of the invention will be described with reference to FIGS. 1 to 10. A desk-top circular sawing machine 1 which is a desk-top cutting machine, shown in FIG. 1 includes a rotating mechanism, and is mainly composed of a base part 2 and a cutting part 3.

The base part 2 is mainly composed of a base 21 which carries and supports a wood material W that is a workpiece to be cut, a turntable 22 which is rotatably carried and supported on the base 21, and a fence 23 installed at the base 21. The base 21 is, as shown in FIG. 2, composed of a pair of left base 21A and right base 21B. A direction where these left base 21A and right base 21B are arranged in a row is defined as a left-right direction, an upper side of the base 21 surface on which the wood material W (FIG. 1) is placed is defined as "up", and an opposite side to the "up" is defined as "down".

Figure 2:
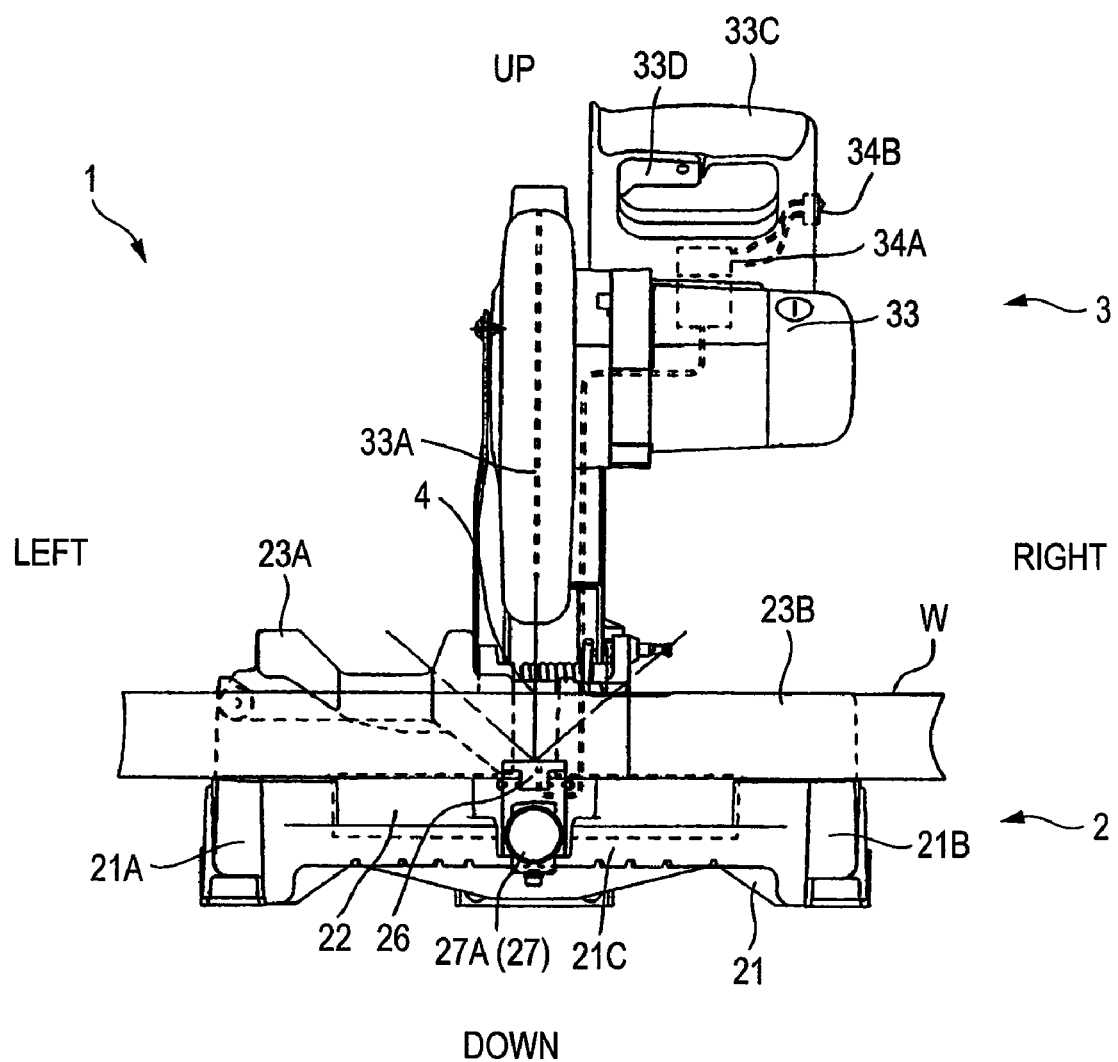
FIG. 2 is a front view of the desk-top cutting machine according to the embodiment of the invention.
Figure 3:
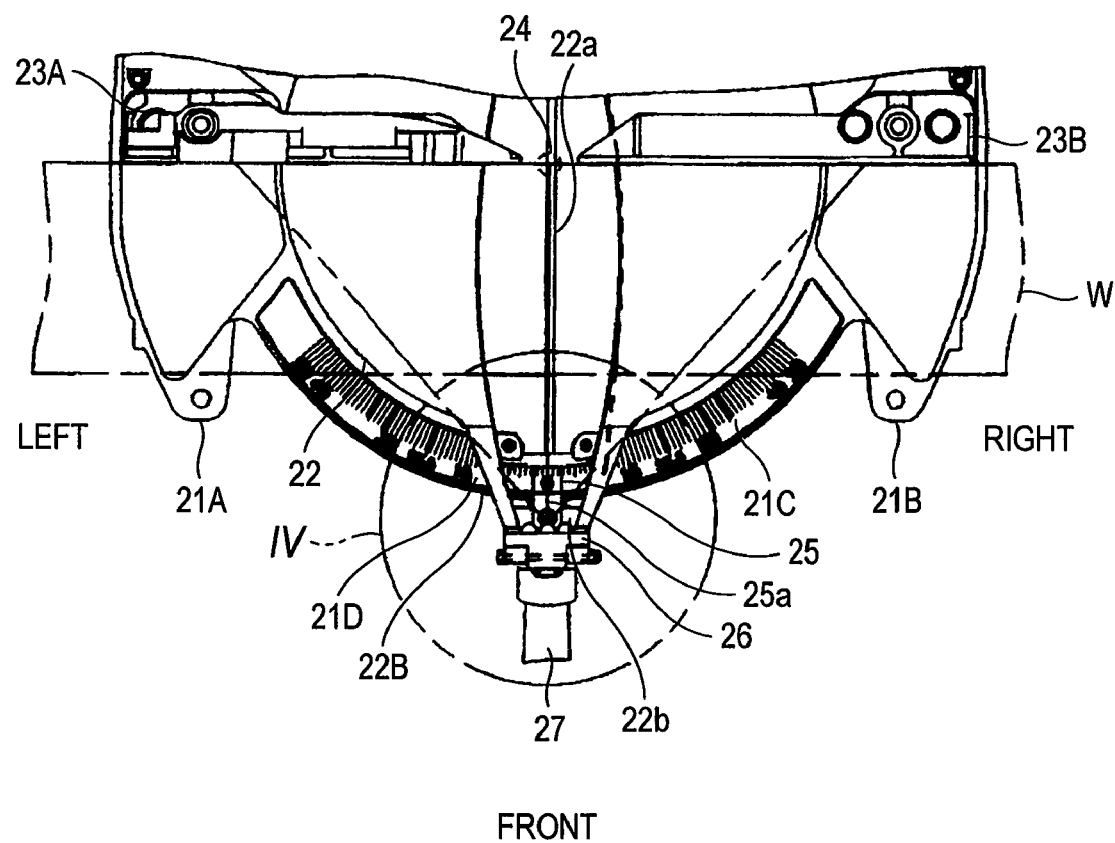
FIG. 3 is a partial plan view of the desk-top cutting machine according to the embodiment of the invention.

Further, as shown in FIGS. 2 and 3, between the left base 21A and the right base 21B, there is provided an arcuate part 21C which is formed nearly arcuately and connects the left base 21A and the right base 21B. On this arcuate part 21C, there is a scale part 21D in which angles are divided right and left with its center position as 0°, as shown in FIG. 3.

The turntable 22 is carried and supported on the base 21 through a rotating shaft part 24 as shown in FIG. 1, and arranged between the right base 21B and the left base 21A as shown in FIG. 2. As shown in FIG. 1, the turntable 22 is composed of a turntable body portion 22A formed in the shape of a nearly circular base, a base portion 22B which protrudes to one side of the turntable body portion 22A and is arranged over the arcuate part 21C, and a cutting part supporting portion 22C which is provided on the other side of the turntable body portion 22A and supports the cutting part 3. A direction in which this base portion 22B protrudes from the turntable and which is orthogonal to the left-right direction is defined as a front direction, and a direction opposite to the front direction is defined as a back direction.

Further, on the upper surface of the turntable 22, as shown in FIG. 3, a groove portion 22a is continuously formed from a position near the cutting part supporting portion 22C (FIG. 1) to the base portion 22B. This groove portion 22a is arranged on the rotating shaft portion 24, and located in the same position as an intersection position when a later-described cutting blade 4 swings downward and intersects the turntable 22. In this groove portion 22a, a blade edge of the cutting blade 4 is housed.

As shown in FIG. 3, in the base portion 22B, a space portion 22b is formed, and an indicator part 25, an irradiation unit 26, and a regulation operating part 27 are provided as shown in FIGS. 1 and 3. The space portion 22b has, in the base portion 22B, an opening on its upper surface. From this opening, the arcuate part 21C located below the base portion 22B can be recognized visually through the space 22b.

Figure 4:
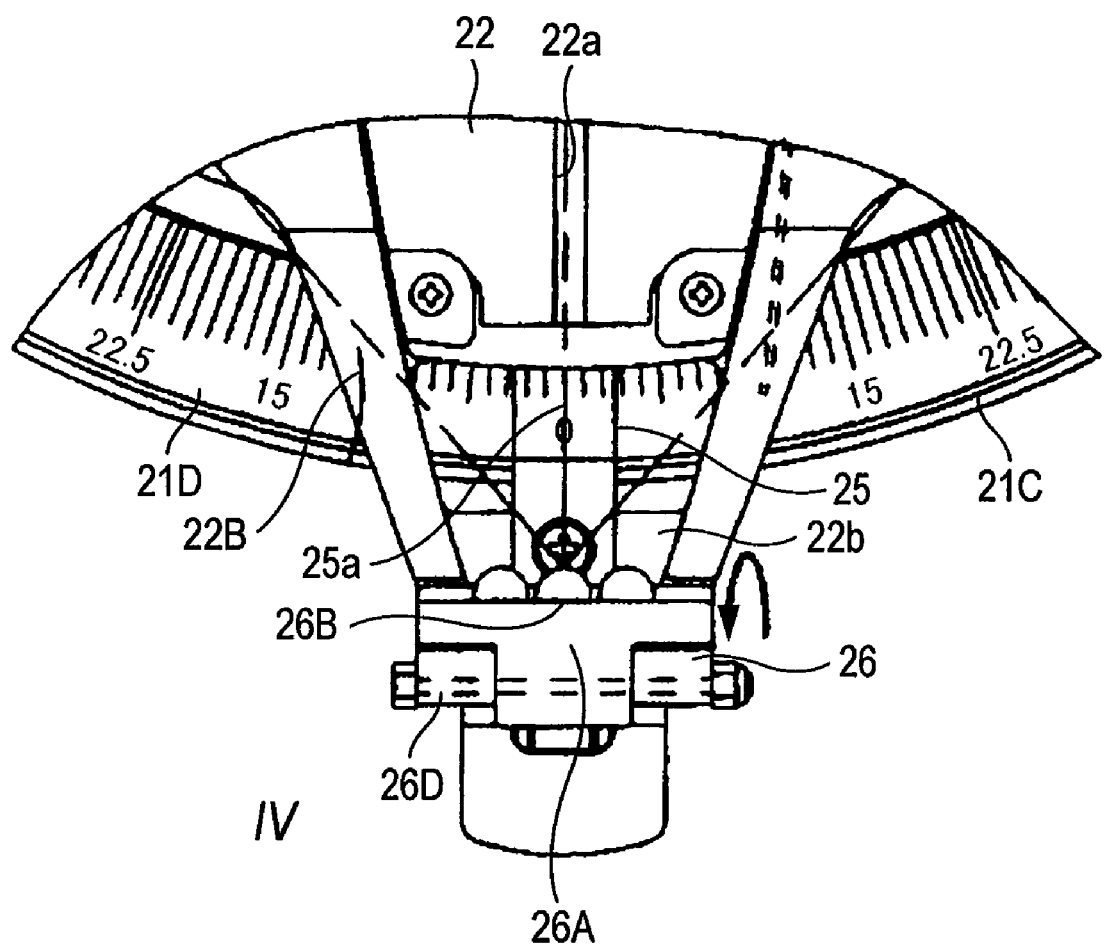
FIG. 4 is a partially detailed view in a round frame IV of FIG. 3.

The indicator part 25 is formed of a transparent member such as an acryl plate, and arranged on the scale part 21D in the space portion 22b as shown in FIG. 4. Therefore, the scale divisions on the scale part 21D can be recognized visually through the indicator part 25. Further, in the indicator part 25, an indicator groove 25a is formed along the extended position of the groove portion 22a. Therefore, by aligning this indicator groove 25a with an arbitrary scale division of the scale part 21D, the groove portion 22a can be aligned with the arbitrary scale division. This indicator part 25 and the scale part 21D constitute a rotary angle display part.

Figure 5:
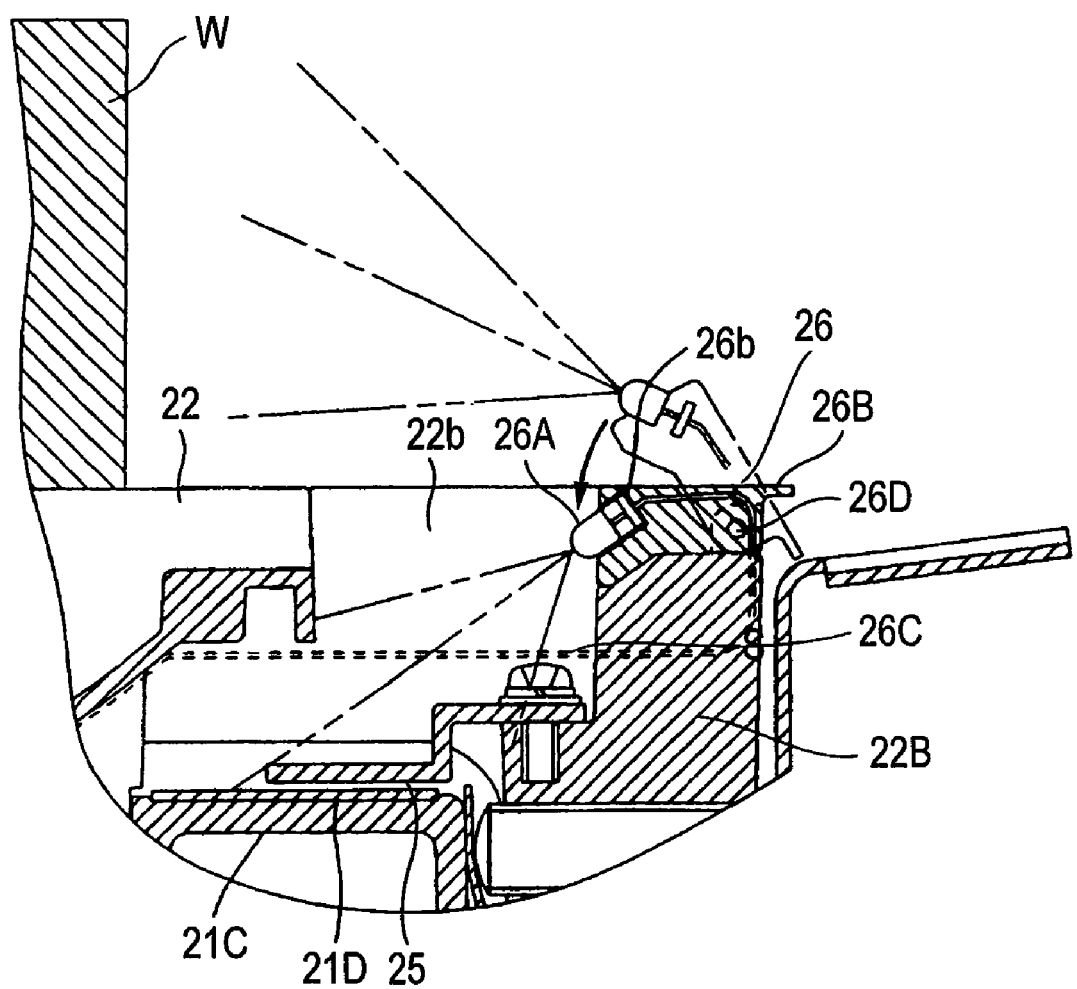
FIG. 5 is a partially detailed view in a round frame V of FIG. 1.
Figure 6:
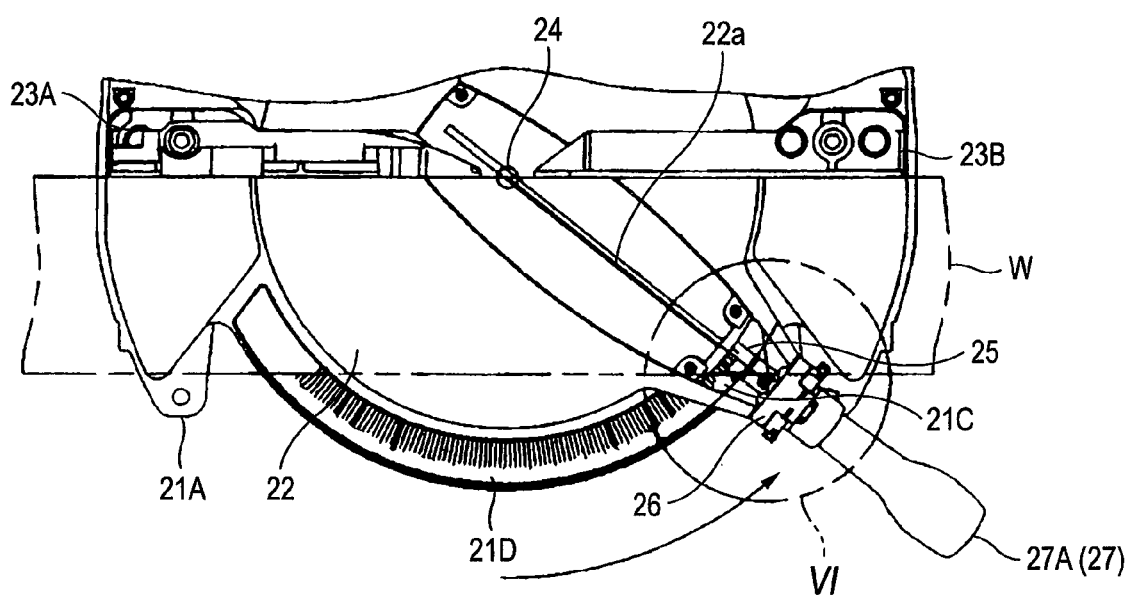
FIG. 6 is a partial plane view in case that a rotating operation of the desk-top cutting machine according to the embodiment of the invention is performed.
Figure 7:
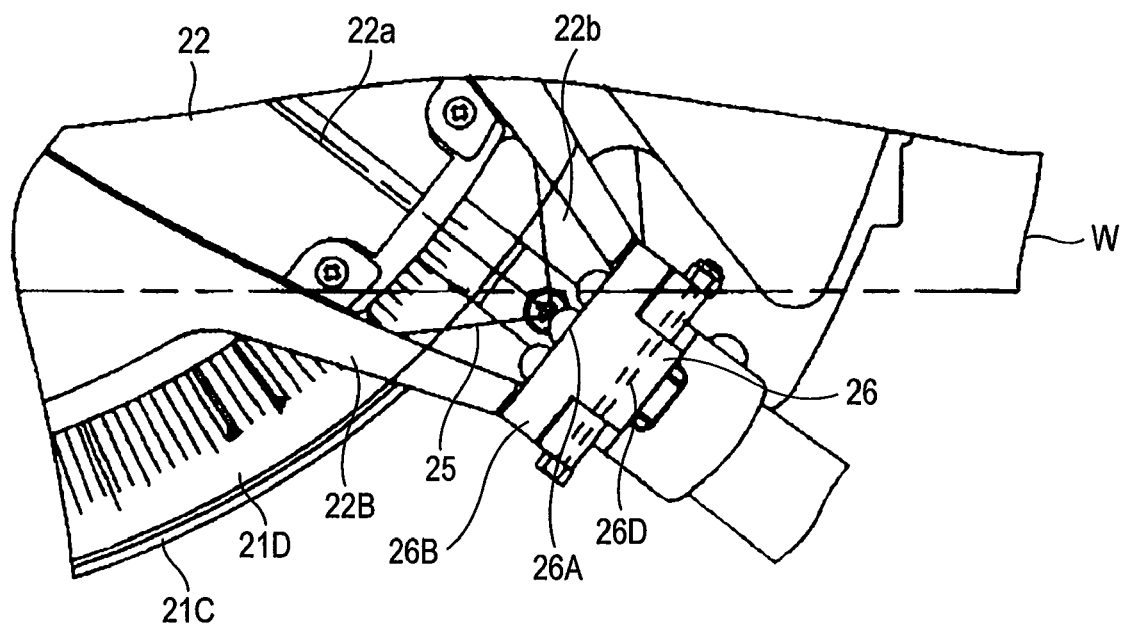
FIG. 7 is a partially detailed view in a round frame VI of FIG. 6.

The irradiation unit 26, as shown in FIG. 5, is mainly composed of an irradiation part 26A and an irradiation supporting part 26B, and arranged on an extension line of the groove portion 22a. The irradiation part 26A uses a LED with high luminance as a light source, and is arranged so as to be located in the space portion 22b at least in a state where it irradiates the indicator part 25. Therefore, even in case that the workpiece has fallen on the base portion 22B, it is possible to prevent damage onto the irradiation part 26A. Since the indicator part 25 is arranged similarly in the space part 22b, it is protected from a fall of the workpiece. Further, the irradiation part 26A is connected by a leading wire 26C to a power unit 34A described later.

The irradiation supporting part 26B has a space 26b which opens toward the rotating shaft part 24 side, and the irradiation part 26A is inserted into this space 26b. Accordingly, the irradiation part 26A assumes the form of being protected by the irradiation supporting part 26B. In result, even in case that a tool or the like has fallen on the irradiation unit 26, the irradiation part 26A is difficult to be damaged. Further, the irradiation supporting part 26B has a shaft 26D which is orthogonal to the direction where the groove portion 22a extends and parallel to the upper surface of the turntable 22. The irradiation supporting part 26B is rotatably connected through this shaft 26D to the base portion 22B. Therefore, by rotating the irradiation supporting part 26B, the irradiating position of the irradiation part 26A can be changed as shown in FIG. 5, so that the wider range can be irradiated.

The regulation operating part 27 is composed of a fixed handle 27A and a lock lever 27B. The fixed handle 27A functions as a grip when the turntable 22 is rotated, and can fix the turntable 22 at a predetermined rotary angle. The lock lever 27B is mainly provided below the fixed handle 27A and in the lower position of the arcuate part 21C, and can fix the turntable 22 to the base at the determined arbitrary angle.

As shown in FIG. 1, the fence 23 is provided on the base 21 and in the upper position of the turntable 22, and composed of a left fence 23A and a right fence 23B correspondingly to the left base 21A and the right base 21B as shown in FIG. 2. The front surface of the left fence 23A and the front surface of the right fence 23B are arranged so as to be located on the same plane. Further, as shown in FIG. 3, the fence 23 is constructed so that: in a state where the turntable is arranged in the position of the rotary angle 0°, the groove portion 22a and the front surfaces of the left fence 23A and the right fence 23B are nearly orthogonal to each other, and regulates the position of the wood material W.

At the cutting part supporting portion 22C, a tilt shaft 29 for connecting the cutting part supporting portion 22C and the cutting part 3 is provided. The tilt shaft part 29 is arranged so that its shaft is included in the upper surface of the turntable 22 and aligned with the groove portion 22a.

As shown in FIG. 1, the cutting part 3 is mainly composed of a tilt part 31, a swinging shaft part 32, and a cutting body part 33. The tilt part 31 is tiltably connected through the tilt shaft part 29 to the cutting part supporting portion 22C. For the tilt part 31, a clamp lever 31A which screws to the cutting part supporting portion 22C is provided. By screwing forward the clamp lever 31A, the tilt part 31 and the cutting part supporting portion 22C are fixed thereby to set the cutting part 3 at the arbitrary tilt angle. The swinging shaft part 32 is supported by the tilt part 31, and arranged so that its shaft is located nearly in the left and right direction.

The cutting body part 33 is mainly composed of a frame 33A, a housing 33B, a cover 33C, a handle 33D, and a cutting blade 4. The frame 33A is connected to the swinging shaft part 32, and constructed so that it can swing on the tilt part 31. The housing 33B is connected to the frame 33A, forms an outer casing of the cutting body part 33, and includes therein a motor and a gear which are not shown. Further, in the housing 33B, a power unit 34A connected to the irradiation part 26A is provided.

The cover 33C is constructed so that: when the cutting part 3 is located up, the cover 33C covers the cutting blade 4, and when the cutting part 3 is swung downward (toward the turntable 22), the cover 33C exposes the cutting blade to the outside.

The handle 33D is provided up of the housing 33B, and functions as a grip when the cutting part 3 is swung. In the handle 33D, there are provided a trigger 33E for controlling drive of a not-shown motor, and an irradiation switch 34B which is connected to the power unit 34A and controls ON/OFF of the irradiation part 26A.

The cutting blade 4 is rotation-driven by the not-shown motor, and arranged so that a part of the cutting blade 4 is inserted into the groove portion 22a in case that the cutting part 3 is swung downward.

In case that the desk-top circular sawing machine 1 having the above construction is used in the dark, firstly, the fixed handle 27A is loosened, the irradiation switch 34B is pushed on in a state where the turntable 22 is rotatable, and the irradiation part 26A is turned on. Under this state, the irradiation supporting part 26B is moved downward, and rotated at the predetermined angle in a state where the irradiation part 26A irradiates the indicator part 25 with the light.

The desk-top circular sawing machine 1 is constructed so that the 0°-position of the scale part 21 is set in the center position of the base, and the indicator part 5 is provided in the space portion 22b provided at the front end of the turntable. Hereby, the user is easy to recognize the rotary position with a sense. Therefore, even in case that the user is not an expert operator, he can grasp the rotary position suitably. Accordingly, compared with the conventional desk-top circular sawing machine in which the 0°-position of the scale part is arranged in a position out of the center position of the base, it is possible to prevent erroneous recognition caused by dislocation.

Further, since the indicator part 25 is located in the space portion 22b, there is a case where the shadow of the wall of the base portion 22B constructing the space portion 22b falls on the indicator part 25 and the scale part 21D. In this case, the user is difficult to recognize the rotary angle. However, since the irradiation part 26A irradiates the indicator part 25 with the light, the indicator part 25 and the scale part 21D can be readily read even in the dark, so that adjustment of the rotary angle can be readily performed. Further, in the desk-top circular sawing machine 1, the base portion 22B is located on the front side which is the operator's side. Therefore, by applying the light toward the indicator part 25 from this position, operator's visibility for the rotary angle display part can be heightened.

After the rotary angle has been set in the irradiation part 26A, the clamp lever 31A is loosened, and the cutting part 3 is tilted to be set at an arbitrary tilt angle. Thereafter, the clamp lever 31A is tightened, and the arbitrary tilt angle is set. Next, a wood material W is placed on the base 21, the irradiation supporting part 26B is rotated upward as shown in FIG. 5, and the light is applied to the vicinity of the side surface on the front side of the wood material W. Hereby, even in case that an ink line for a cutting position is previously drawn on the side surface on the front side of the wood material W, this ink line can be readily recognized visually, and the cutting operation can be suitably performed.

Figure 8:
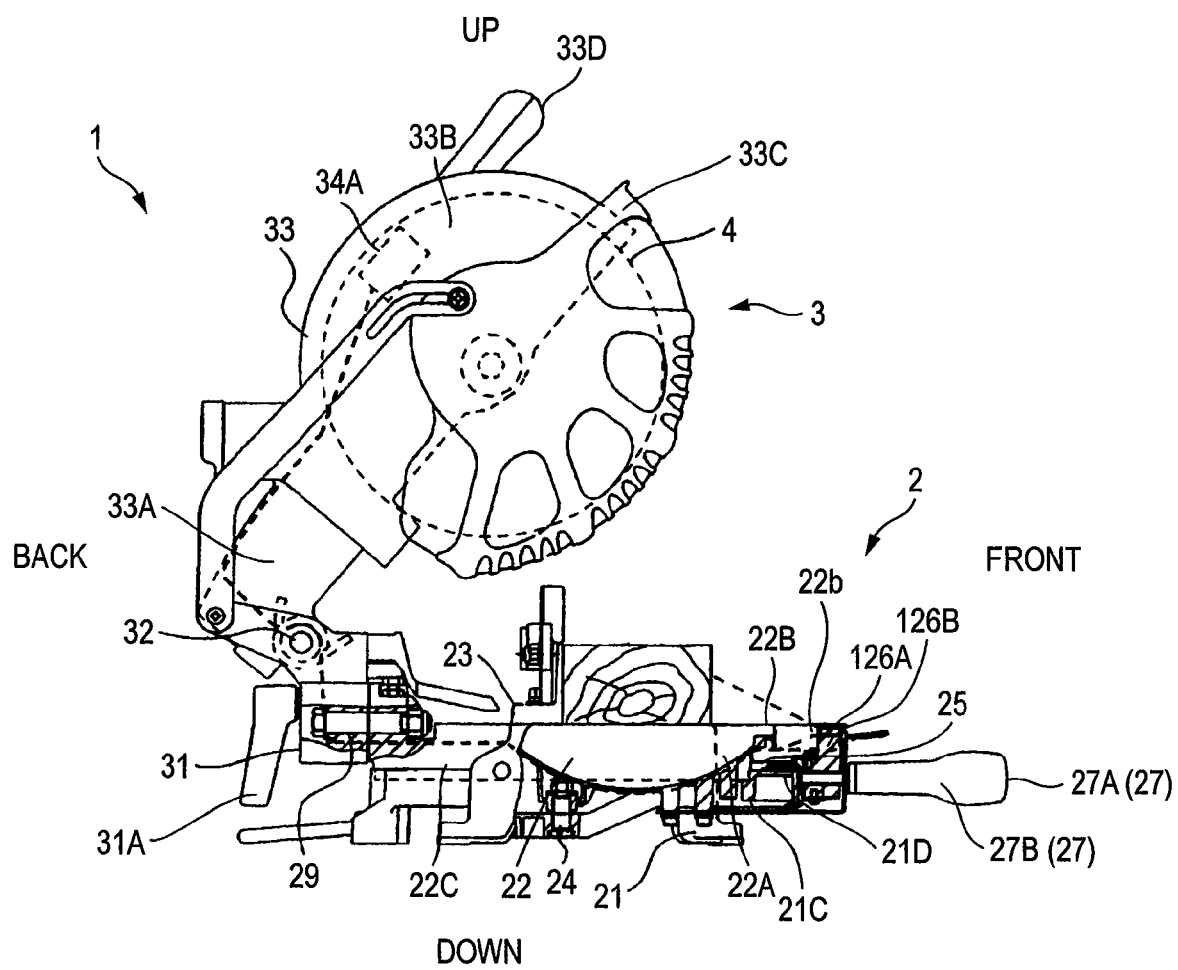
FIG. 8 is a side view in a modified example of the desk-top cutting machine according to the embodiment of the invention.

The desk-top cutting machine according to the invention is not limited to the above-mentioned embodiment but various modification and improvements can be made within the scope as set out in the accompanying claims. For example, as shown in FIG. 8, the construction in which a laser beam may be emitted from an irradiation part 126A can be adopted. This irradiation part 126A is held by an irradiation supporting part 126B constructed by a part of a base part 22B, its part which emits the laser beam is arranged in a space portion 22b. Therefore, it is possible to prevent the irradiation part 126A from being damaged by collision of the wood material W with the irradiation part 126A.

Figure 9:
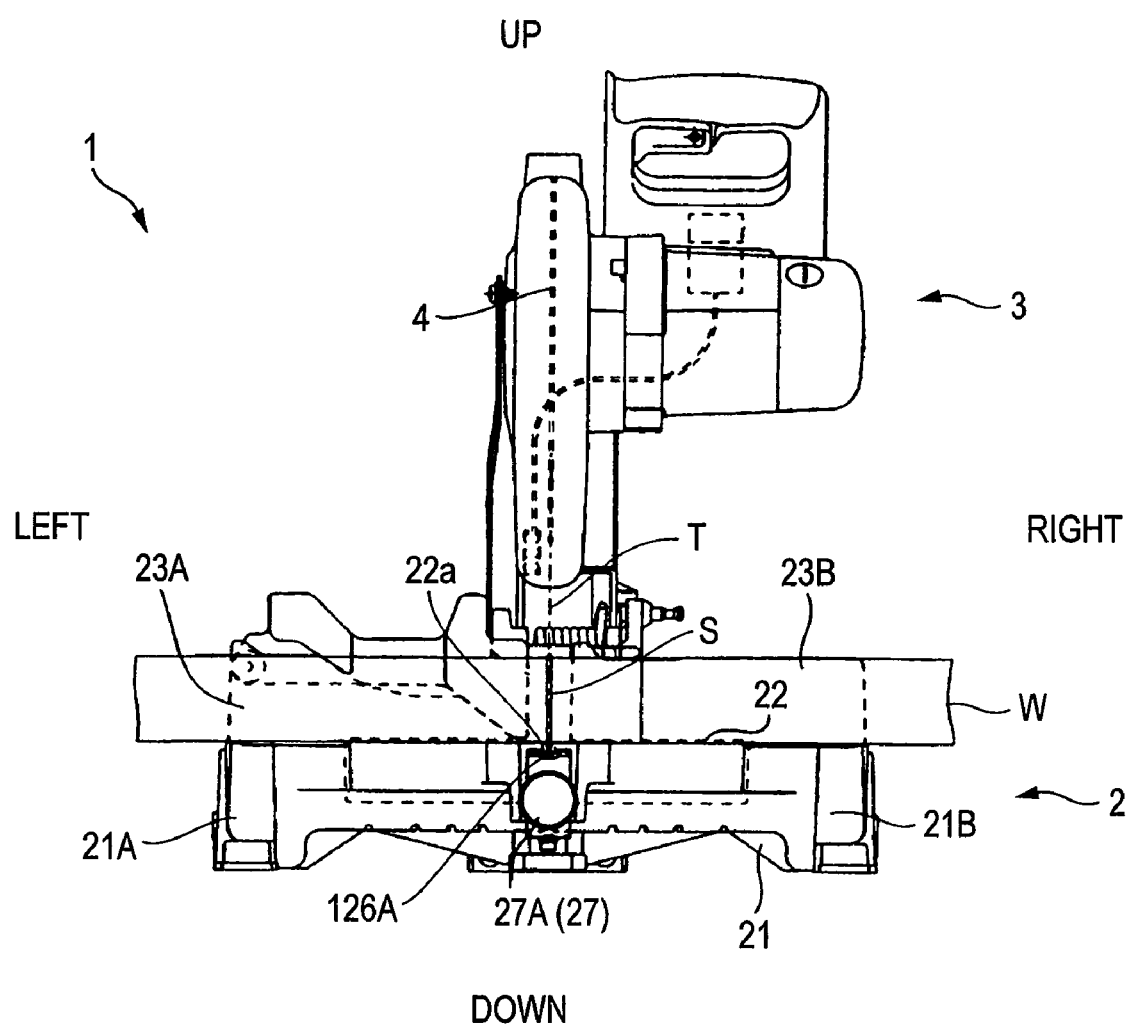
FIG. 9 is a front view in the modified example of the desk-top cutting machine according to the embodiment of the invention.

Under the above construction, the laser beam emitted from the irradiation part 126A, as shown in FIG. 9, in a state where a cutting part 3 is arranged so that the side surface of a cutting blade 4 is nearly orthogonal to the upper surface of a turntable 22, irradiates at least the groove 22a formed on the shaft of a tilt shaft part 29 and forms an irradiation area S along a locus T when the cutting blade 4 is swung. In this state, since the laser beam is applied along a cutting position of the wood material W, that is, along a marking line on the side surface, the marking line can be readily recognized, and accuracy in cutting can be increased.

Figure 10:
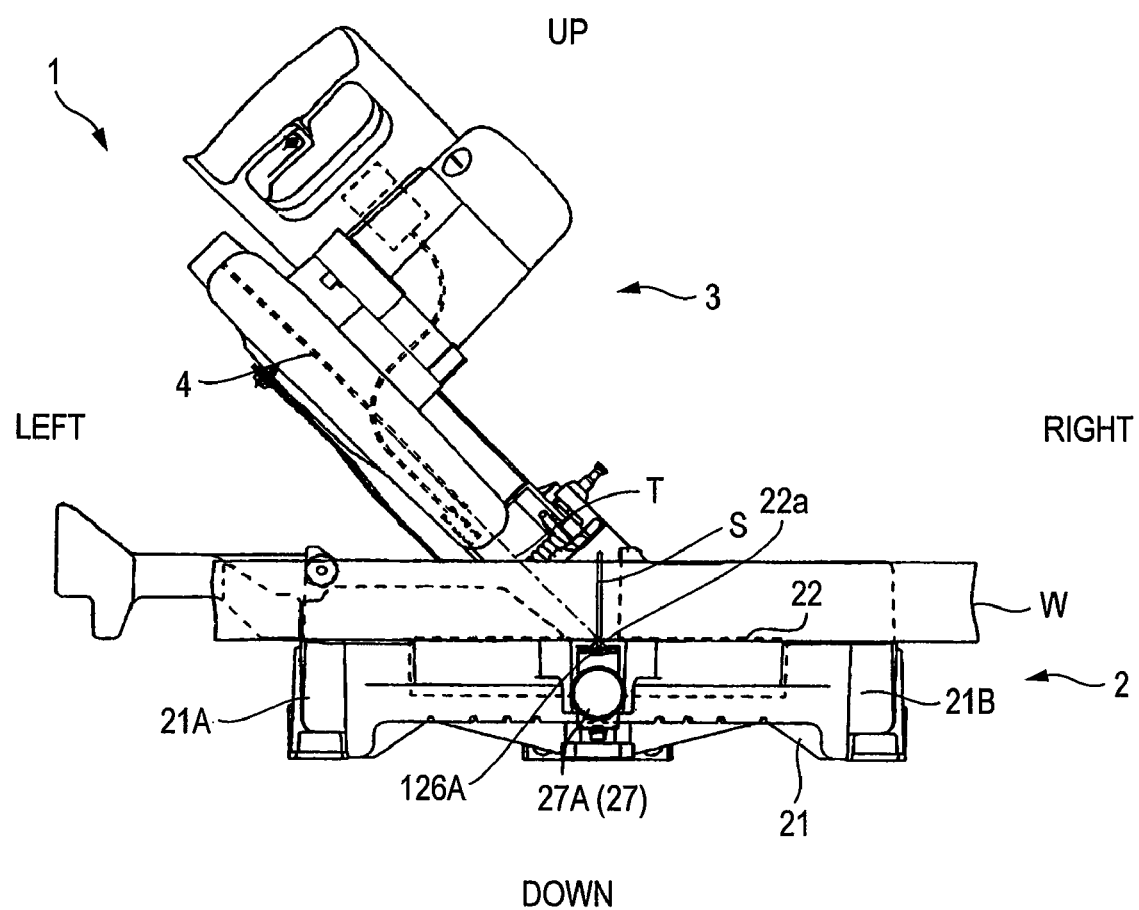
FIG. 10 is a front view in a tilt state in the modified example of the desk-top cutting machine according to the embodiment of the invention.

Further, even in case that the cutting part 3 is tilted as shown in FIG. 10, the locus of the cutting blade 3 intersects the groove 22a. Further, the irradiation area S of the laser beam is located also in the groove 22a. Since the laser beam is emitted along a shaft of a tilt shaft part 29 as described above, the locus of the cutting blade 4 and the laser beam intersect at the groove 22a that becomes the extension line portion of the tilt shaft part 29. Therefore, in a state where the wood material W is placed on the turntable 22, a wood material W portion which becomes the extension line portion of the tilt shaft part 29, that is, a cutting end portion on the side surface of the wood material W can be visually recognized, and this portion can be used as a guide in the cutting time.

Further, between the irradiation part 126A and the irradiation supporting part 126B, a fine adjustment mechanism may be provided, which can move the irradiation part 126A in the rotating shaft direction of the cutting blade 4 and can adjust parallelism between the cutting blade 4 and the laser beam emitted from the irradiation part 126A in a state where the cutting blade 4 is orthogonal to the upper surface of the base part 2.

Also in this case, since the irradiation part 126A is arranged in the space portion 22b to prevent the wood material W from coming into contact with the irradiation part 126A, the fine adjustment by the slight adjustment mechanism is difficult to go wrong, and the state where the parallelism has been finely adjusted can be kept for a long period.

What is claimed is:

1. A desk-top cutting machine comprising:
  a base that supports a workpiece;
  a turntable being carried and supported on the base rotatably around a rotating shaft part;
  a cutting part being disposed on the turntable, the cutting part having a pivoting shaft part, supporting a cutting blade up off the turntable, and pivoting the cutting blade to and from the turntable;
  a rotary angle display part that displays a rotary angle of the turntable with the base; and
  an irradiation unit being provided on the turntable and positioned near the rotary angle display part, the irradiation unit emitting light that at least partly illuminates the rotary angle display part,
  wherein the rotary angle display part includes:
    a scale part provided on the base; and
    an indicator part provided on the turntable to indicate the scale part,
  wherein the irradiation unit includes an irradiation part configured to be selectively rotated between a position where the irradiation part protrudes above an upper surface of the turntable, and a position where the irradiation part does not protrude above the upper surface of the turntable to illuminate at least the indicator part from above.

2. The desk-top cutting machine according to claim 1, wherein the turntable has a cutting part supporting portion which supports the cutting part, and a base portion which is provided on the opposite side of the cutting part supporting portion in relation to the rotating shaft part, and
  wherein the irradiation unit is provided on the base portion.

3. The desk-top cutting machine according to claim 2, wherein the irradiation unit includes an irradiation supporting part,
  wherein the irradiation part has a light source which can emit light towards the rotating shaft part, and
  wherein the irradiation supporting part rotatably supports the irradiation part through a shaft which is orthogonal to a direction from the rotating shaft part to the irradiation part and parallel to the upper surface of the turntable.

4. A desk-top cutting machine comprising:
  a base that supports a workpiece;
  a turntable being carried and supported on the base rotatably around a rotating shaft part;
  a cutting part being disposed on the turntable, the cutting part having a pivoting shaft part, supporting a cutting blade up off the turntable, and pivoting the cutting blade to and from the turntable;
  a rotary angle display part that displays a rotary angle of the turntable with the base; and an irradiation unit being provided on the turntable and positioned near the rotary angle display part, the irradiation unit emitting light that at least partly illuminates the rotary angle display part, wherein the turntable has a cutting part supporting portion which supports the cutting part, and a base portion which is provided on the opposite side of the cutting part supporting portion in relation to the rotating shaft part, wherein the irradiation unit is provided on the base portion, wherein the irradiation unit includes an irradiation part and an irradiation supporting part, wherein the irradiation part has a light source which can emit light towards the rotating shaft part, and wherein the irradiation supporting part rotatably supports the irradiation part through a shaft which is orthogonal to a direction from the rotating shaft part to the irradiation part and parallel to the upper surface of the turntable, wherein the irradiation supporting part has a space which opens toward the side of the rotating shaft part, wherein the indicator part is arranged between the irradiation supporting part and the rotating shaft part, and wherein the irradiation part is arranged in the space of the irradiation supporting part and illuminates the indicator part.

5. The desk-top cutting machine according to claim 1, wherein the irradiation unit emits a laser beam onto a swinging locus of the cutting blade in a state where the side surface of the cutting blade is orthogonal to the upper surface of the turntable.

6. The desk-top cutting machine according to claim 5, wherein a tilt shaft part is provided between the cutting part and the turntable, wherein the tilt shaft part is arranged on the same plane as the upper surface of the turntable so as to be substantially orthogonal to the pivoting shaft part, wherein the cutting part is pivotally connected to the turntable about the tilt shaft part, and wherein the irradiation unit is constructed to emit the laser beam along a tilt shaft of the tilt shaft part.

* * * * *